Figure 1:
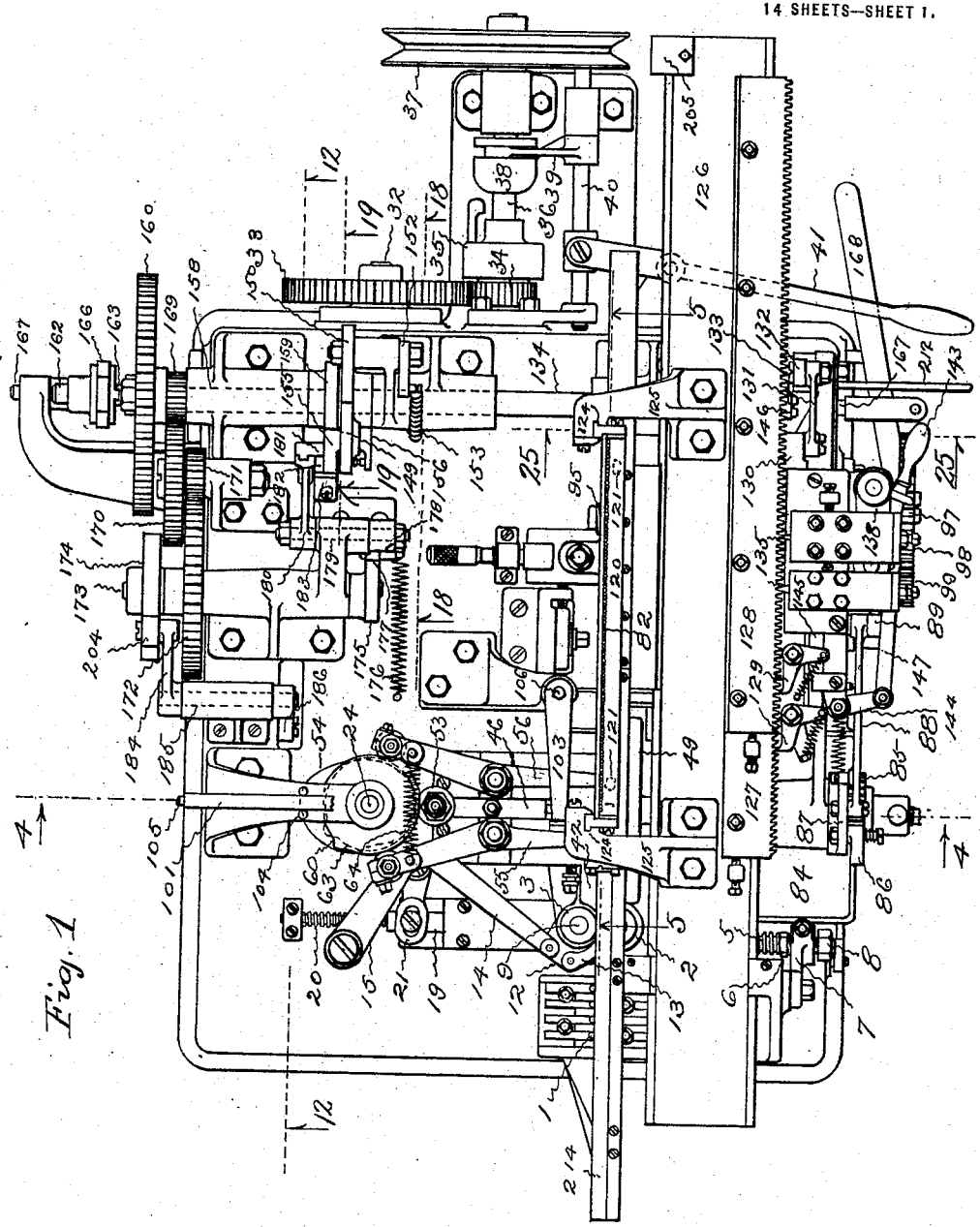

J. MERRITT & W. A. SAWYER.
MACHINE FOR MAKING WIRE LINKS.
APPLICATION FILED DEC. 16, 1912. RENEWED MAR. 8, 1916.

1,186,928.

Patented June 13, 1916.
14 SHEETS—SHEET 1.

J. MERRITT & W. A. SAWYER.
MACHINE FOR MAKING WIRE LINKS.
APPLICATION FILED DEC. 16, 1912. RENEWED MAR. 8, 1916.

1,186,928.

Patented June 13, 1916.
14 SHEETS—SHEET 2.

Witnesses:

Inventors:
Joseph Merritt
W. A. Sawyer.
by Harry R. Williams
Attorney.

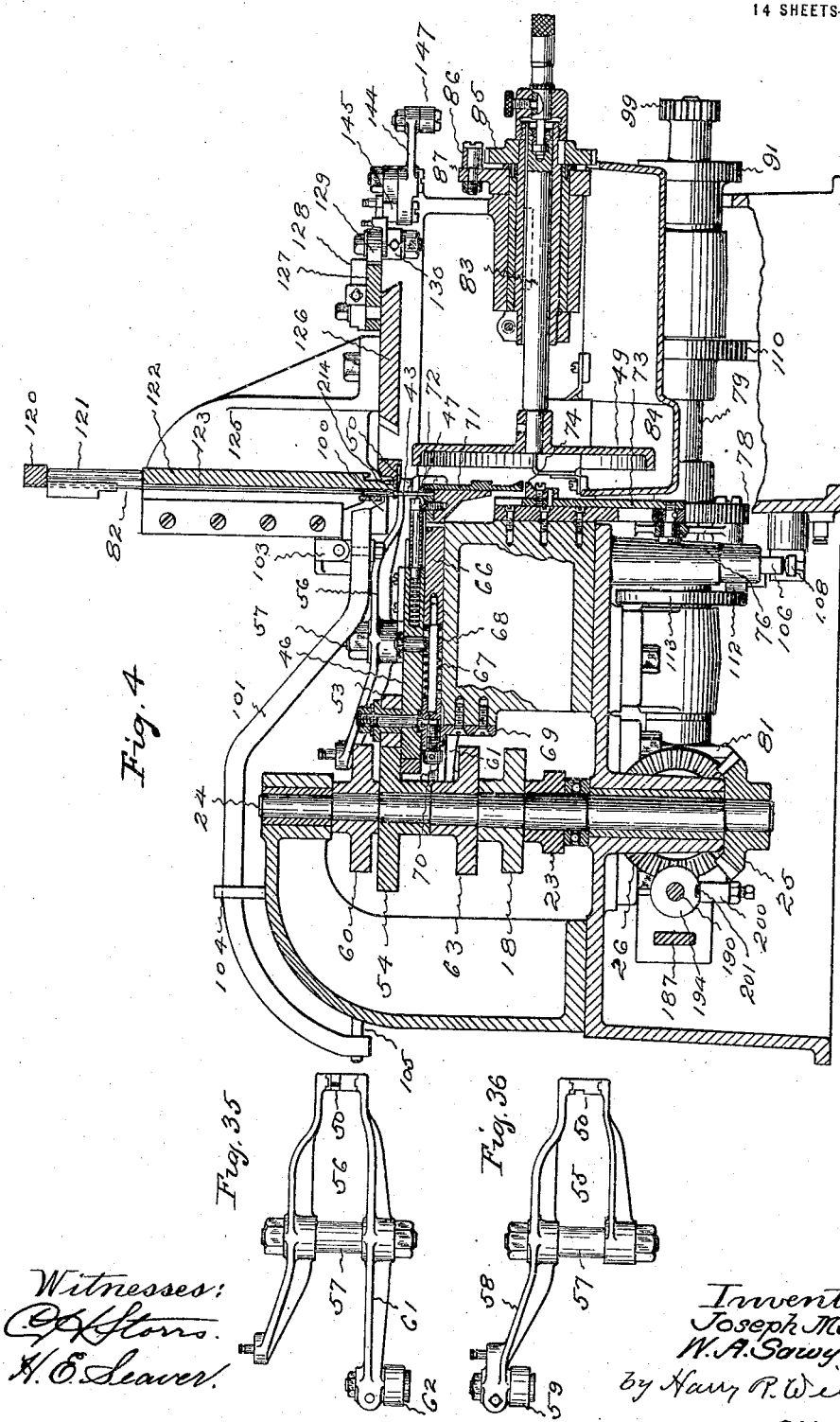

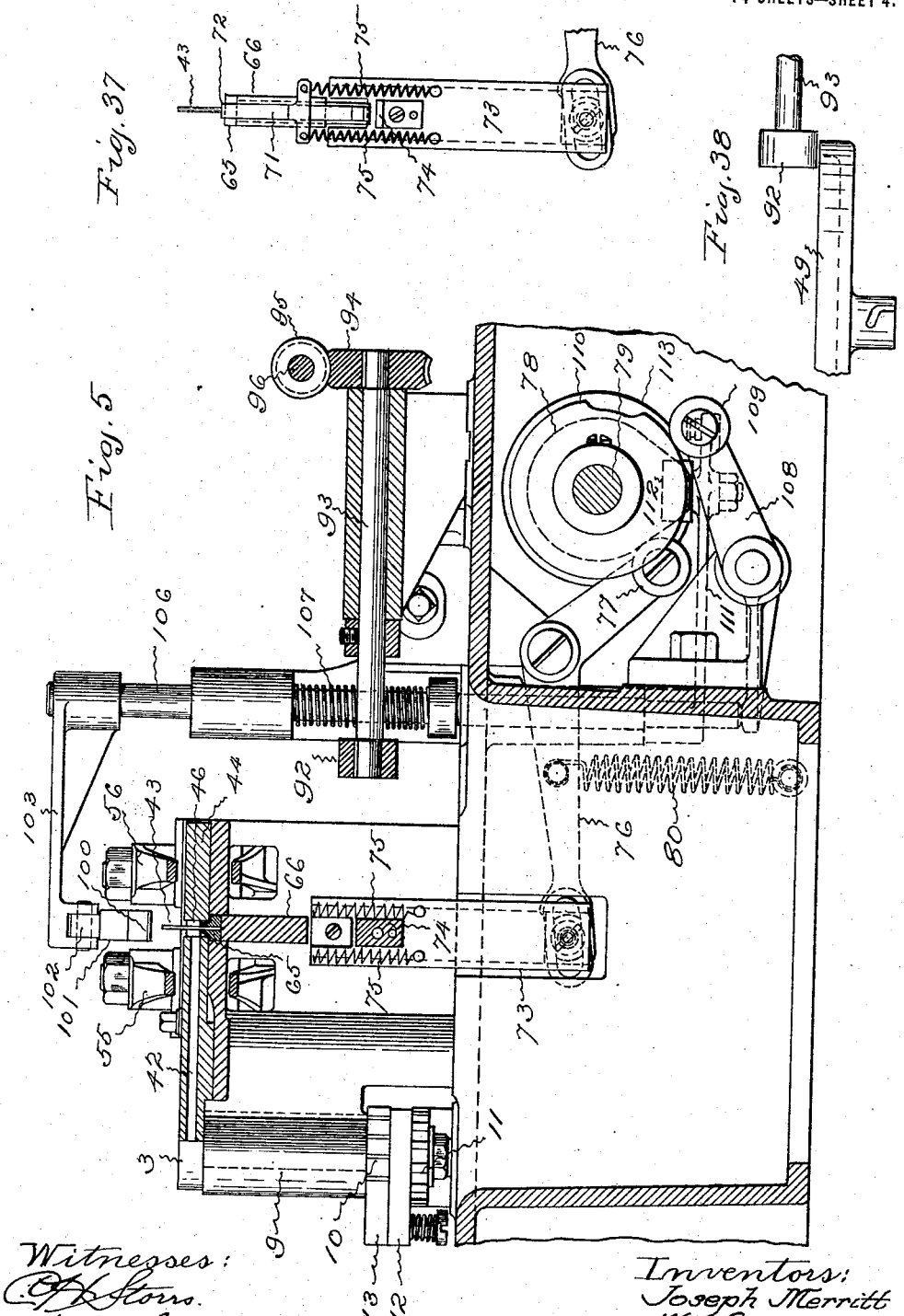

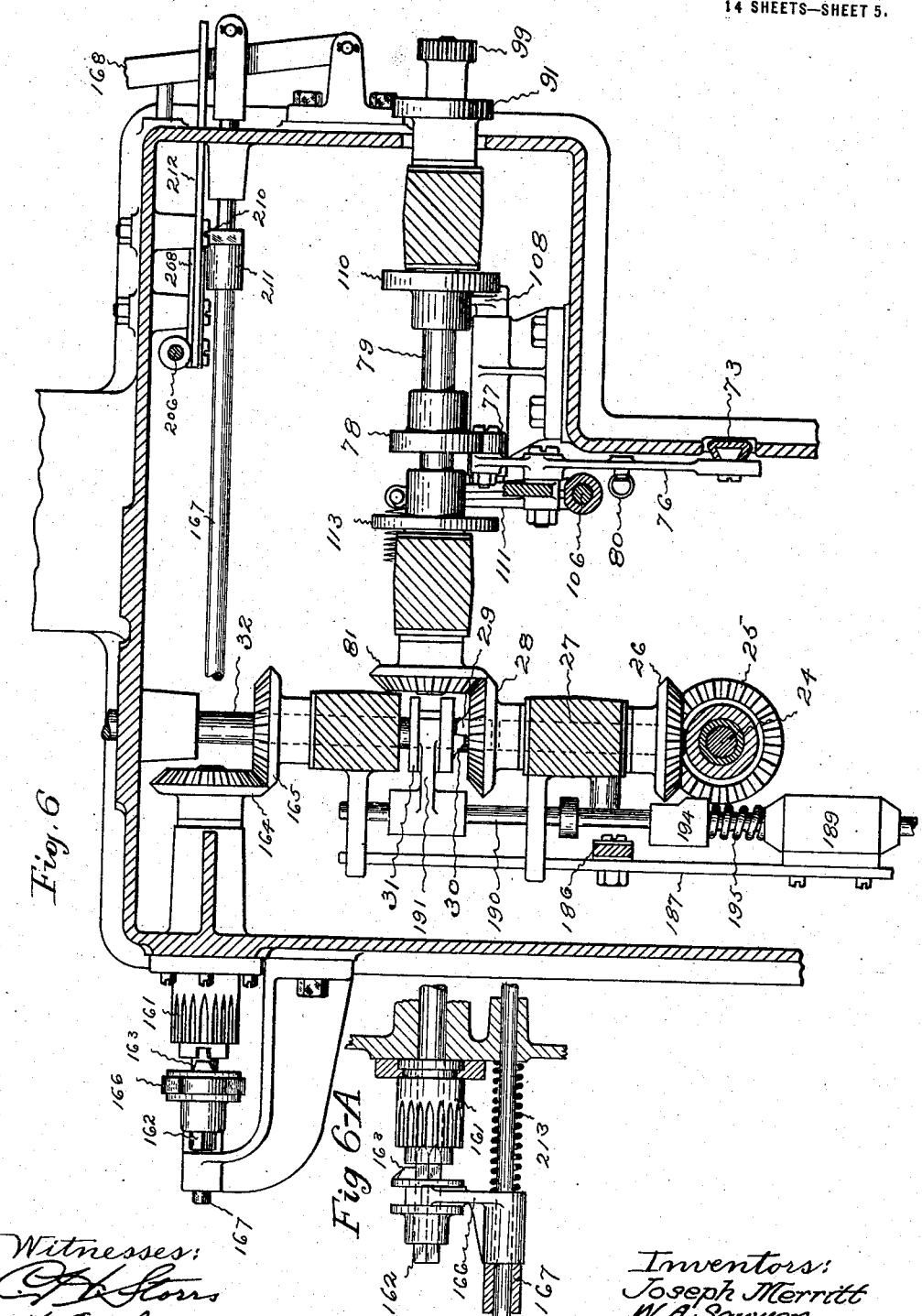

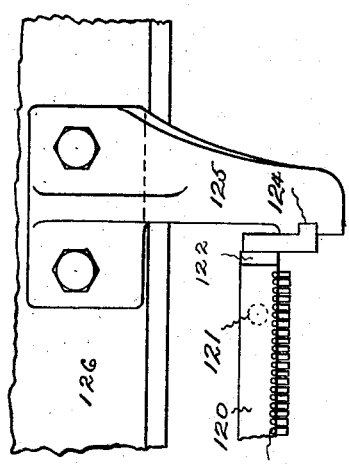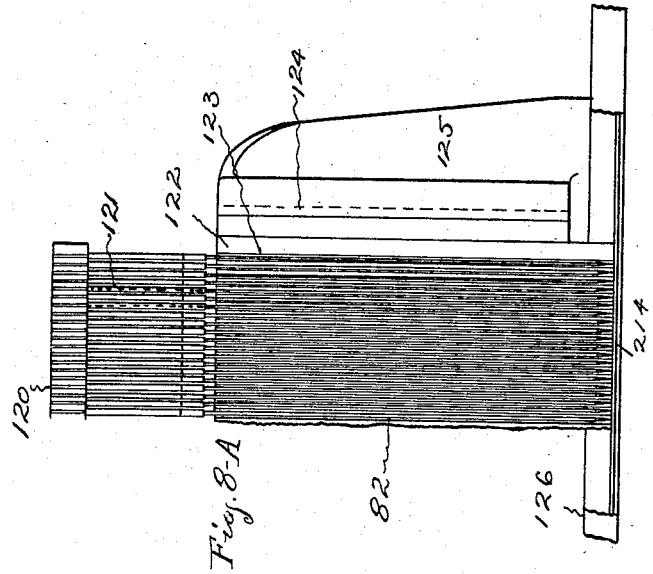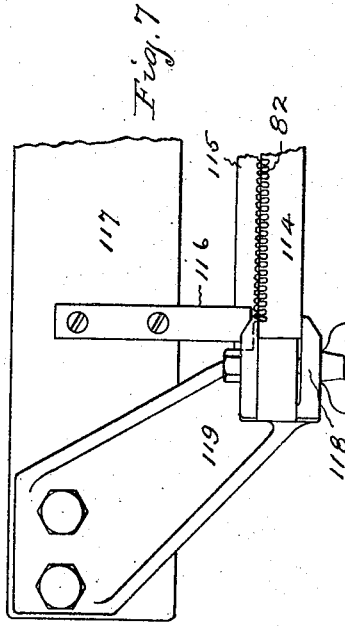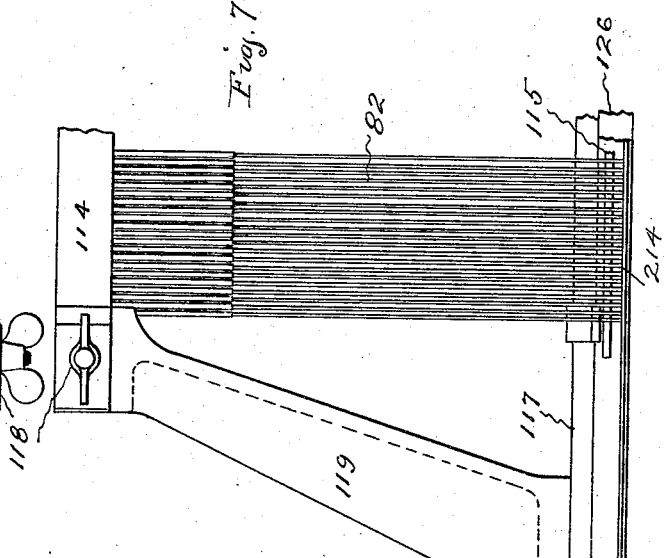

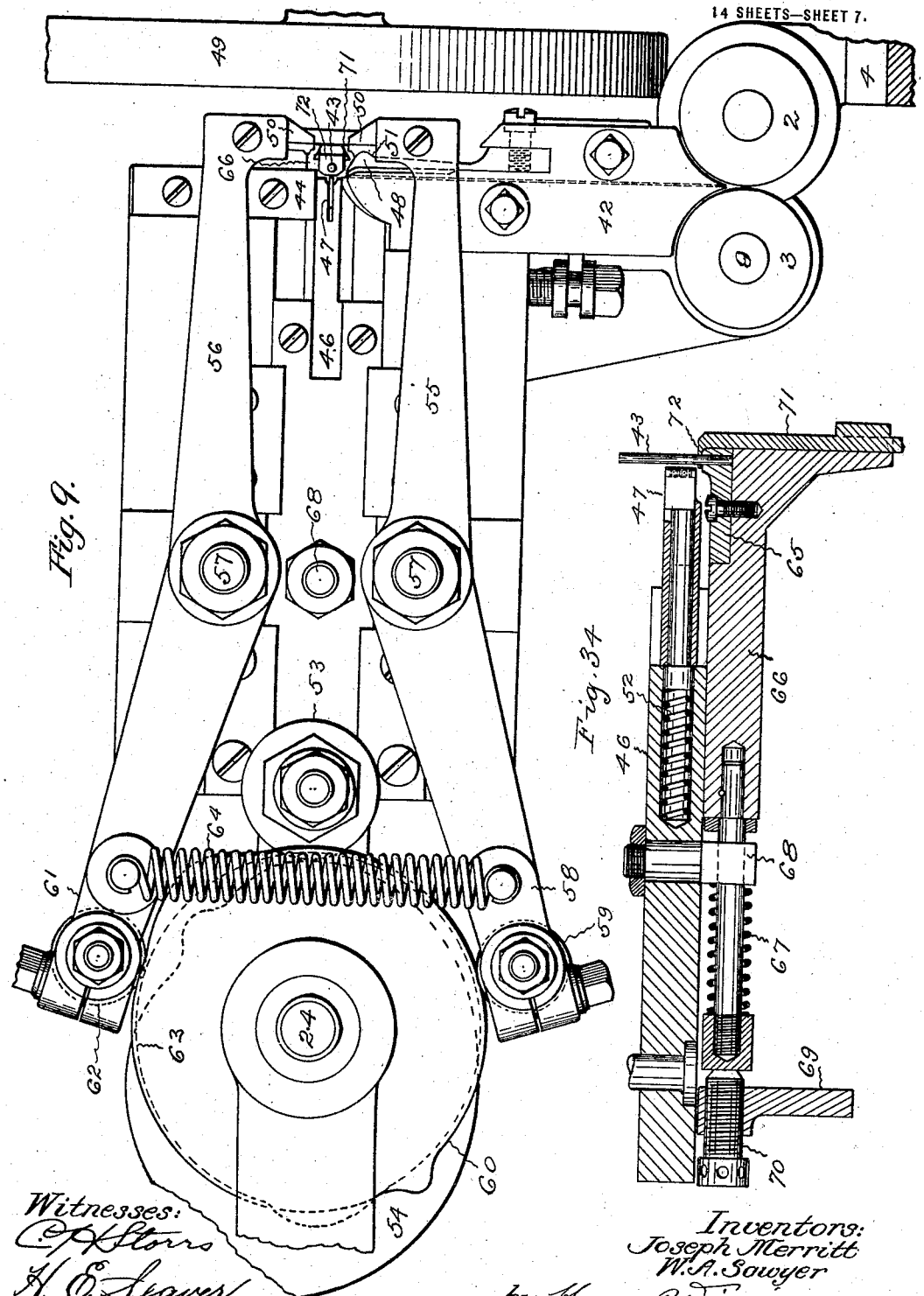

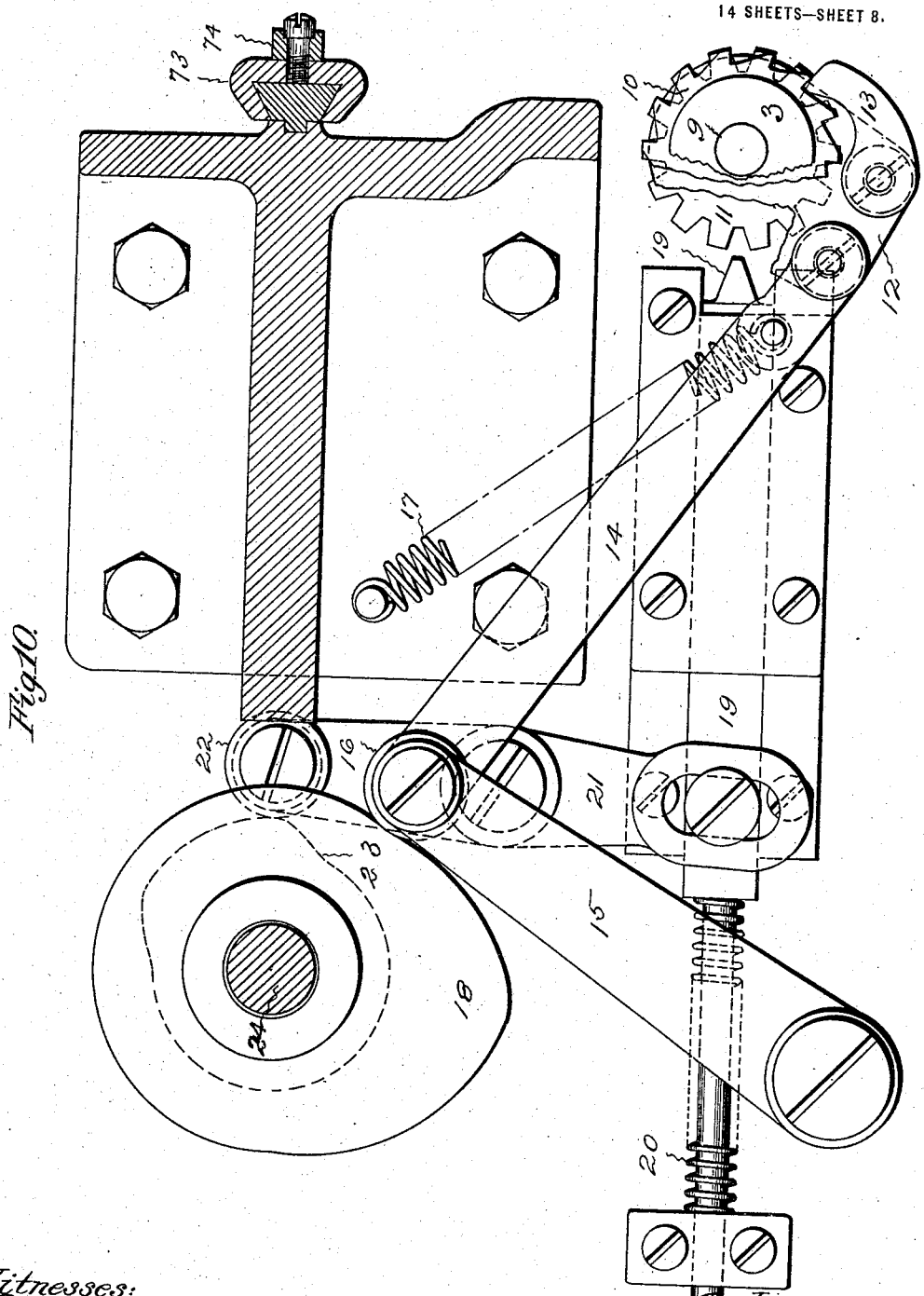

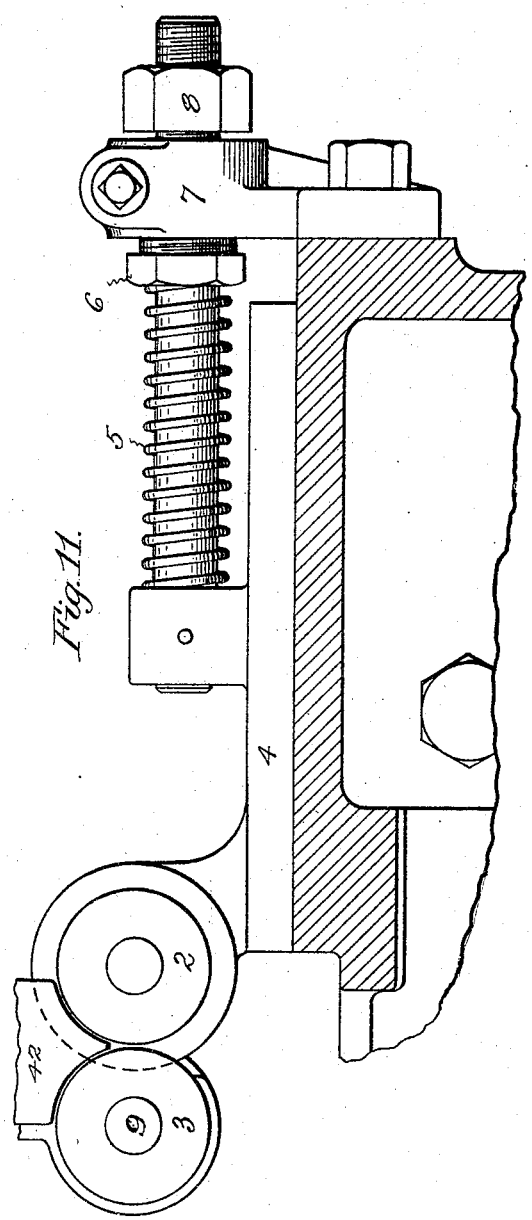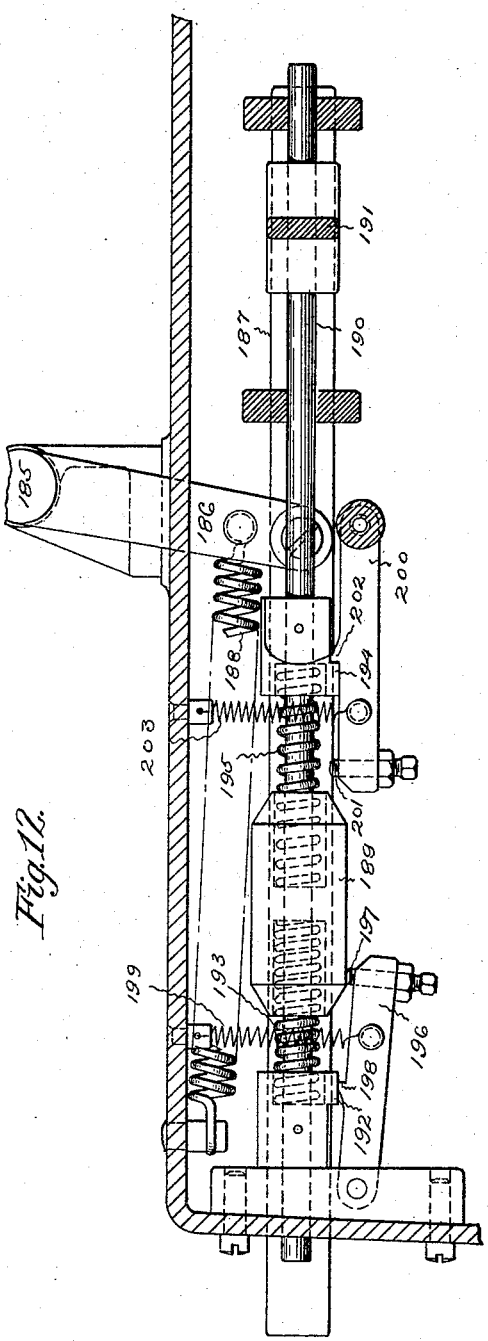

J. MERRITT & W. A. SAWYER.
MACHINE FOR MAKING WIRE LINKS.
APPLICATION FILED DEC. 16, 1912. RENEWED MAR. 8, 1916.

1,186,928.

Patented June 13, 1916.
14 SHEETS—SHEET 10.

Witnesses:

Inventors:
Joseph Merritt
W. A. Sawyer
by Harry P. Williams
Attorney.

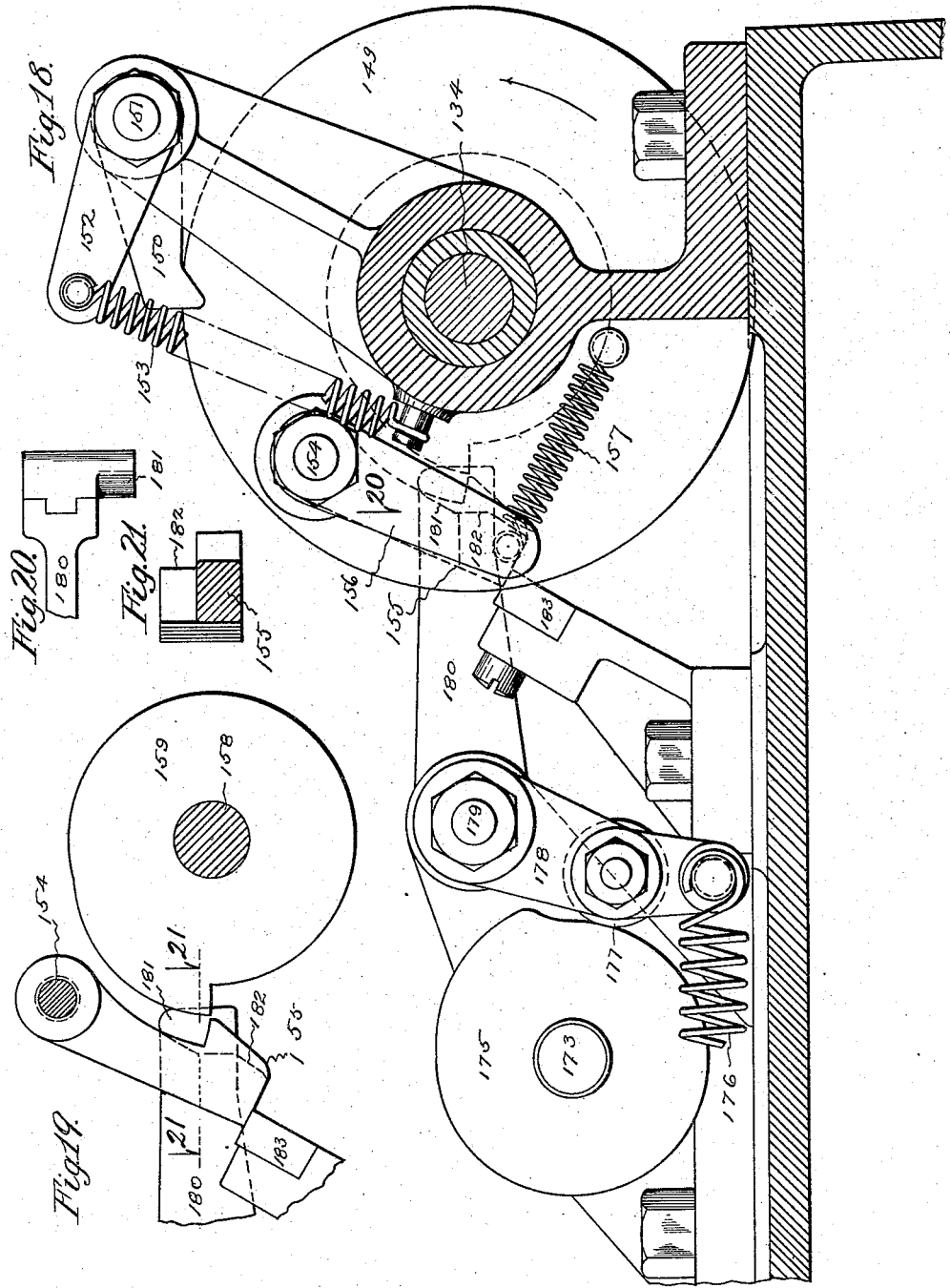

J. MERRITT & W. A. SAWYER.
MACHINE FOR MAKING WIRE LINKS.
APPLICATION FILED DEC. 16, 1912. RENEWED MAR. 8, 1916.
1,186,928.
Patented June 13, 1916.
14 SHEETS—SHEET 12.
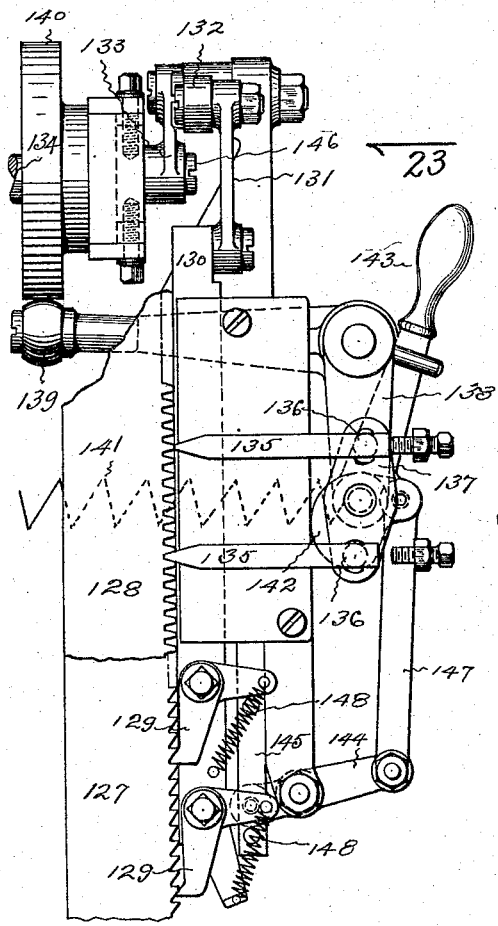
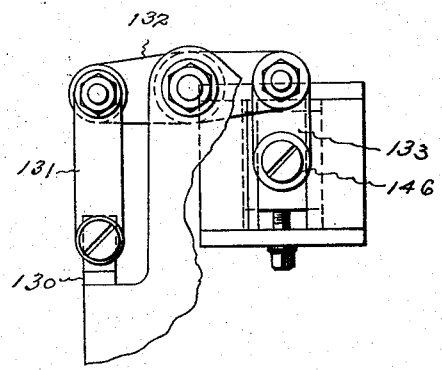
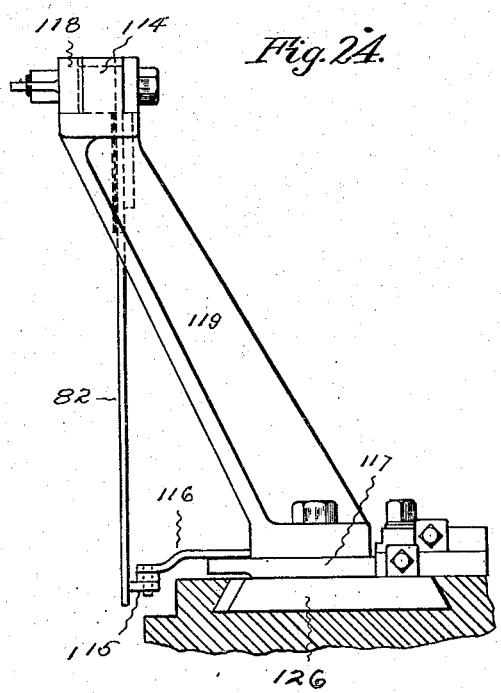
Witnesses:
O. H. Storrs.
H. E. Leaver.
Inventors:
Joseph Merritt
W. A. Sawyer.
by Harry R. Williams
Attorney.

J. MERRITT & W. A. SAWYER.
MACHINE FOR MAKING WIRE LINKS.
APPLICATION FILED DEC. 16, 1912. RENEWED MAR. 8, 1916.
1,186,928.
Patented June 13, 1916.
14 SHEETS—SHEET 13.
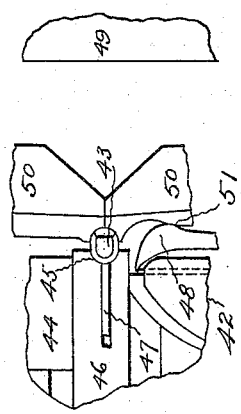
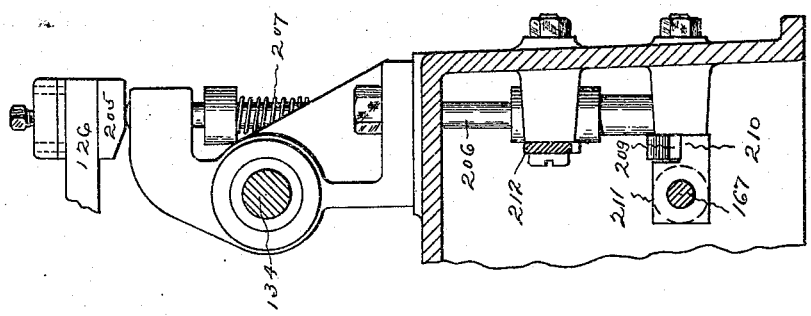
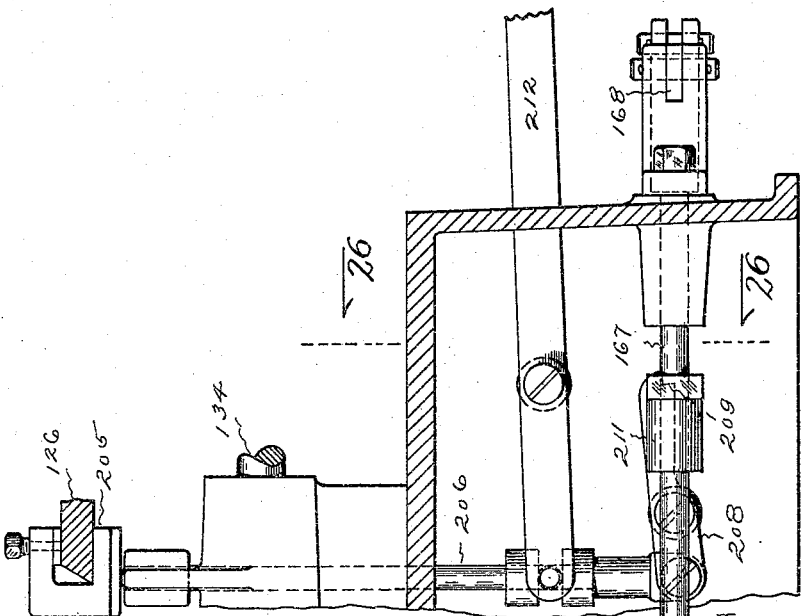
Witnesses:
Inventors:
Joseph Merritt
W. A. Sawyer
by Harry R. Williams
Attorney.

J. MERRITT & W. A. SAWYER.
MACHINE FOR MAKING WIRE LINKS.
APPLICATION FILED DEC. 16, 1912. RENEWED MAR. 8, 1916.

1,186,928.

Patented June 13, 1916.
14 SHEETS—SHEET 14.

Witnesses:
C. H. Storrs
H. E. Leaver

Inventors:
Joseph Merritt.
W. A. Sawyer.
by Harry P. Williams
Attorney.

UNITED STATES PATENT OFFICE.

JOSEPH MERRITT, OF HARTFORD, AND WILLIAM A. SAWYER, OF WEST HARTFORD, CONNECTICUT; SAID SAWYER ASSIGNOR TO SAID MERRITT.

MACHINE FOR MAKING WIRE LINKS.

1,186,928. Specification of Letters Patent. Patented June 13, 1916.

Application filed December 16, 1912, Serial No. 737,061. Renewed March 8, 1916. Serial No. 82,920.

*To all whom it may concern:*

Be it known that we, JOSEPH MERRITT and WILLIAM A. SAWYER, citizens of the United States, residing at Hartford and West Hartford, respectively, in the county of Hartford and State of Connecticut, have invented a new and useful Improvement in Machines for Making Wire Links, of which the following is a specification.

This invention relates to a machine which is designed to make both closed links or rings and open links or staples from continuous lengths of wire, and to load these closed and open links, or rings and staples, into magazines in such condition that the filled magazines containing many thousand links can be transferred to a machine which will take the rings and staples and assemble them into a continuous link-mesh fabric.

The object of this invention is to provide a machine which will very rapidly and accurately produce large quantities of closed or open links from continuous lengths of wire and load the links into magazines in proper condition for the subsequent manipulation alluded to.

The machine which is illustrated as embodying the invention at each revolution feeds a plural number of wires the proper distance to provide the correct lengths for the links. The lengths of wire fed are then cut off and by suitable benders formed into U-shape. The ends of the U-shaped pieces are then coated with a fluxing material so that subsequently they may be securely united. If closed links are to be produced the U-shaped pieces with fluxed ends are then by formers bent so as to bring the ends together, but if open links are to be produced the ends are bent toward each other only slightly. After this the links thus formed are loaded onto a magazine rod. The machine runs continuously and these steps are repeated at each revolution. After a number of such revolutions have taken place, and a magazine rod is filled with links the magazine is moved sidewise so as to bring an empty rod into line with the loading mechanism. When all the magazine rods are full the machine stops.

Figure 2:
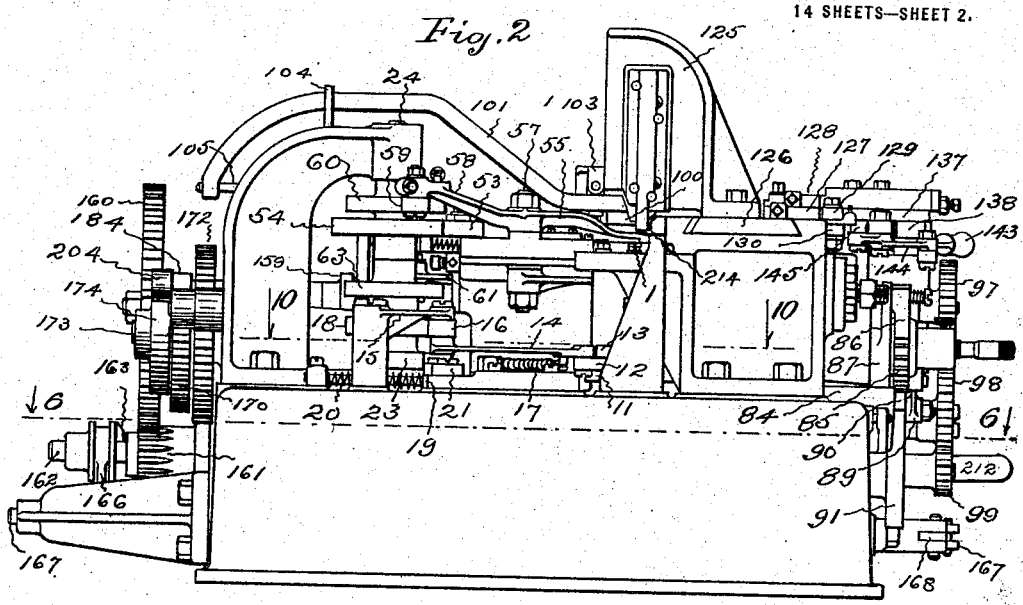
Figure 3:
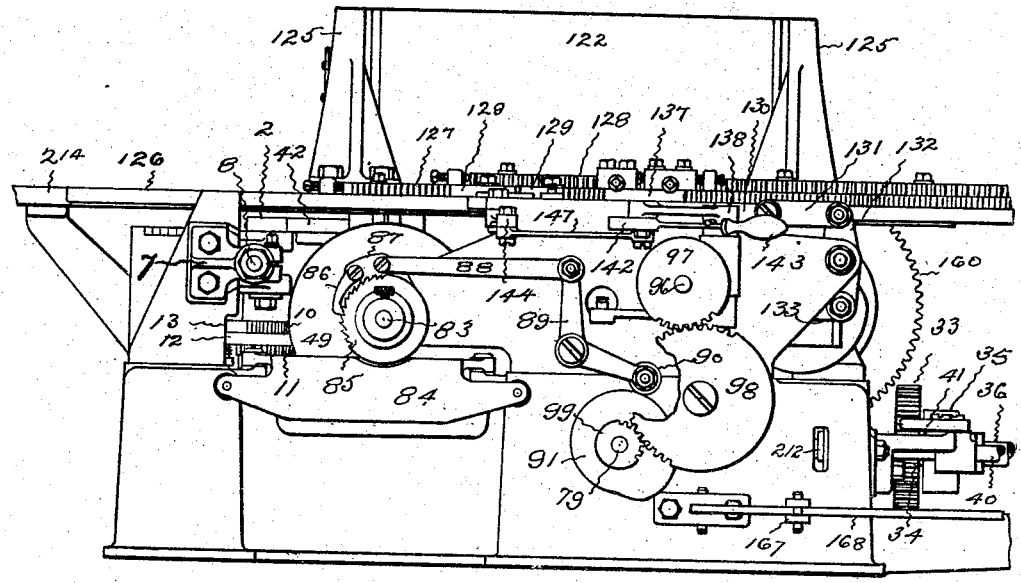

Figure 1 of the accompanying drawings shows a plan of the machine set up for making closed links or rings. Fig. 2 shows an elevation looking at the left-hand side of the machine shown in Fig. 1. Fig. 3 shows an elevation looking at the front of the machine. Fig. 4 is a vertical section looking toward the right on the plane indicated by the dotted line 4—4 on Fig. 1, and shows the bending, fluxing and magazine loading parts. Fig. 5 is a vertical section on a larger scale on the plane indicated by the dotted line 5—5 on Fig. 1, looking toward the back of the machine, and showing a part of the mechanism for loading the links onto the magazine rods. Fig. 6 is a horizontal section looking down on the plane indicated by the dotted line 6—6 on Fig. 2, showing the mechanism which stops the operation of the forming parts while the magazine is being indexed. Fig. 6<sup>A</sup> shows an elevation of the clutch mechanism provided for connecting the magazine feeding and locking mechanisms with the driving means. Fig. 7 shows an enlarged plan of one end of the open link magazine and its holding frame. Fig. 7<sup>A</sup> shows an elevation of the part of the open link magazine and its support seen in Fig. 7. Fig. 8 shows an enlarged plan of one end of the closed link magazine and its holding frame. Fig. 8<sup>A</sup> shows an elevation of the part of the closed link magazine and its support seen in Fig. 8. Fig. 9 shows a plan of the feed rolls, the bender, formers and fluxing wheel, and bender and former actuating mechanisms. Fig. 10 is a horizontal section on the plane indicated by the dotted line 10—10 on Fig. 2, showing an enlarged plan of the feed roll actuating mechanism. Fig. 11 shows a plan of the feed rolls and the carriage for the idle roll. Fig. 12 is a vertical section looking from the front on the plane indicated by the dotted line 12—12 on Fig. 1, showing an enlarged view of the clutch mechanism for stopping the link making mechanism while the magazine is being indexed. Figs. 13, 14, 15, 16 and 17 illustrate the various positions occupied by the parts that load the links onto the magazine rods. Fig. 18 is a vertical section on the plane indicated by the dotted line 18—18 on Fig. 1, showing the mechanism for actuating and timing the movements of the magazine indexing means. Fig. 19 is a vertical section on the plane indicated by the dotted line 19—19 on Fig. 1 and shows a part of the mechanism back of that shown in Fig. 18. Fig. 20 shows a plan of the end of the index unlocking lever shown in Fig. 18 looking in the direction of the arrow 20 on the latter view. Fig. 21 is a section of the end of the index engaging latch on the plane indicated by the dotted line 21—21 on Fig. 19. Fig. 22 shows a plan of the magazine feed pawls and locking bolts and their actuating mechanisms. Fig. 23 is a side elevation of part of the mechanism shown in Fig. 22 looking in the direction of the arrow 23 on the latter view. Fig. 24 shows an end elevation of the staple magazine and its support. Fig. 25 is a vertical section on plane indicated by the dotted line 25—25 on Fig. 1, showing the trip for stopping the machine. Fig. 26 is a vertical section of the trip mechanism on the plane indicated by the dotted line 26—26 on Fig. 25. Fig. 27 shows the shapes of the bender and formers for making open links or staples. Figs. 28, 29, 30, 31, 32 and 33 show the bender and formers in the various positions occupied while making closed links or rings. Fig. 34 shows a vertical section of the bender carrying the holding plate, and the slide that is movable with the bender and which carries the mandrel pin and the ejector. Fig. 35 shows an edge view of the inside of the former and former lever, seen in Fig. 4. Fig. 36 shows an edge view of the outside of the other former and its operating lever. Fig. 37 shows a front view of the ejector and the means for raising and lowering it. Fig. 38 shows the relation of the fluxing wheel and gage roll.

In the machine illustrated, a plural number of fine wires, one above the other, are drawn into the left-hand side of the machine between the straightening pins 1 by the feed rolls 2 and 3. (Fig. 1). The feed roll 2, which is an idle roll, is mounted on a slide 4 which is thrust back by a spring 5 so that there will be the necessary pressure between the two rolls to give the required friction for feeding the wires. The tension of the spring 5 is adjusted by a nut 6 on a bushing that is screwed into the bracket 7 that is fastened to the frame. A nut 8 is provided to draw the slide forward and open the space between the feed rolls. (Fig. 11). The roll 3 is fixed to an arbor 9 which bears a ratchet wheel 10 and a lock wheel 11. Loose on the arbor 9 between the ratchet wheel and the lock wheel is a plate 12, and mounted on this plate is a pawl 13 that engages the teeth of the ratchet wheel. Connected with the plate is a link 14 and jointed to the link is a swinging arm 15. At the joint between the link and arm is a roll 16 that by a spring 17, connected between the frame and the link, is held in contact with the periphery of the cam 18. (Fig. 10). Adapted to engage with the locking wheel is a bolt 19. This bolt is normally thrust forward by a spring 20 and is drawn back by the lever 21 which bears a roll 22 that is held in contact with the periphery of the cam 23. (Fig. 10). The cam 18 through the link 14, pawl 13 and ratchet wheel 10 intermittently imparts a rotatory movement to the feed wheel 3 for feeding the wires. The cam 23, through the lever 21, draws back the locking bolt from engagement with the teeth of the lock wheel to permit this movement of the feed wheel, but after the movement has been completed, the bolt is thrust forward by its spring and engages the locking wheel so as to hold it with the feed wheel turned the right amount for feeding the correct length of wires to form the links. The cams 18 and 23 are fixed to a shaft 24. (Fig. 10).

Fastened to the lower end of the shaft 24 is a bevel gear 25 (Fig. 4), which is engaged by a bevel gear 26 that is keyed to a shaft 27 upon which is keyed a bevel gear 28. The gear 28 has a clutch lug 29 that is engaged by a clutch lug 30 on the collar 31 that is keyed to the shaft 32. When the collar 31 is moved so as to disengage the clutch lug 30 from the clutch lug 29, the feeding mechanism is stopped. (Fig. 6). At the right side of the machine on the end of the shaft 32 is a spur gear 33 that is engaged by a spur pinion 34. This pinion is by a clutch 35 connected with the driving shaft 36 which bears the driving pulley 37, when the clutch cone 38 is moved up to the clutch by the arm 39 on the rod 40 that is adapted to be moved by the hand lever 41. By means of this hand lever the clutch is engaged or released for driving or stopping the whole machine. (Fig. 1).

Figure 28:
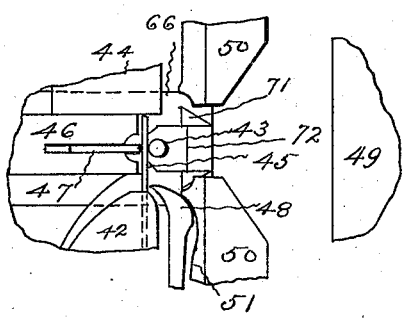
Figure 29:
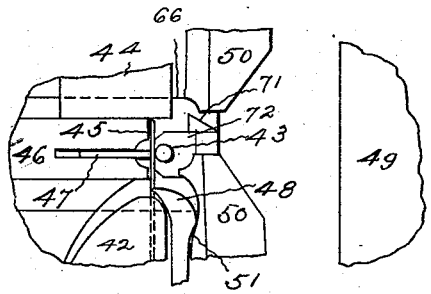
Figure 30:
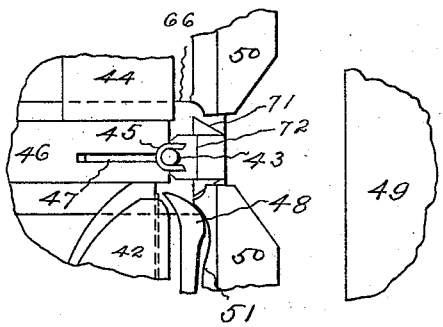
Figure 31:
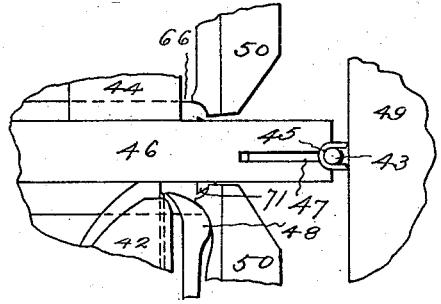
Figure 32:
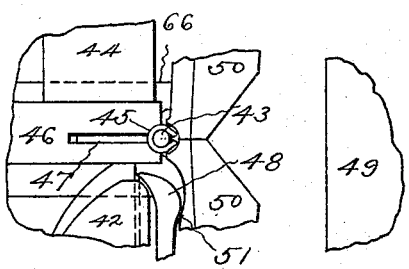
Figure 33:
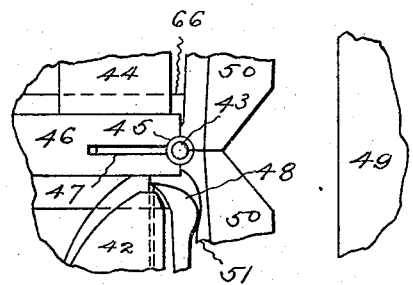

The feed rolls advance the wire through a guide block 42 past a mandrel pin 43 until the ends strike a gage plate 44. (Fig. 9). If closed links or rings are to be formed the mandrel pin is circular in cross section, as shown in Fig. 28; if open links or staples are to be formed the mandrel pin is oblong in cross section, as shown in Fig. 27. With the inner ends of the fed wires 45 in the position shown in Fig. 28, the bender 46 is moved forward. This bender carries a plate 47 which first engages the wires and holds them against the pin. As the bender moves forward, the cutter 48 is forced back so as to cut off the wires. (Fig. 29). The continued forward movement of the bender bends the ends of the severed lengths of wires around the mandrel pin, the end of the bender being shaped so as to accomplish this, as shown in Fig. 30. The bender holding the wires bent about the pin continues its forward movement until the ends of the wires are brought into contact with the face of the fluxing wheel 49. This wheel which has a slow intermittent movement coats the ends of the wires with such material as will cause them to be securely united when they are subsequently soldered or brazed. (Fig. 31). The bender with the wires is then retracted and two formers 50 are brought together so as to bend the ends of the wires toward each other. (Fig. 32). At this time the bender and pin with the wires are moved slightly forward so as to cause the ends of the wires to come together and form the ring. (Fig. 33). If open links or staples are to be made, the formers only turn the ends of the wires in a slight amount, as shown in Fig. 27.

The cutter 48 is a spring plate that is fastened to the guide block 42. (Fig. 9). The cutter is forced back for severing the wire by the engagement with its front edge of the inclined wall 51 on one of the formers 50 when that former is moved toward the other former. (Figs. 27, 29).

The holding plate 47, which is carried in a recess in the bender slide is thrust forward by a spring 52. This spring is stiff enough to cause the plate to hold the wires against the mandrel pin so that they will not get out of place when cut, and will be bent evenly about the pin, and yet will let the plate yield when the bender moves forward for bending the wires. (Figs. 4, 34). The bender slide 46 at its rear end carries a roll 53 which is engaged by the periphery of the cam 54 that is cut so as to give the bender the movements stated. (Fig. 9). The cam 54 is keyed to the vertical shaft 24. (Fig. 4).

The formers 50 are mounted on the front ends of levers 55 and 56. (Fig. 9). These levers are yoke-shaped and at their rear ends are fastened to studs 57, as shown in Figs. 35 and 36. An extension 58 of the upper part of the lever 55 carries a roll 59 that runs in contact with the cam 60 which is near the upper end of the shaft 24. An extension 61 of the lower part of the lever 56 bears a roll 62 that runs in contact with the cam 63 which is on the shaft 24 in a lower plane. (Figs. 4, 9, 35, 36). The levers are normally held with the formers separated and with the rolls against the cams by a spring 64. (Fig. 9). These cams are cut so that as previously described, the lever 55 is first moved to cause the cutter 48 to sever the wires and then after the wires are bent and fluxed to move the levers 55 and 56 so that the formers close together and complete the shaping of the link.

Figure 13:
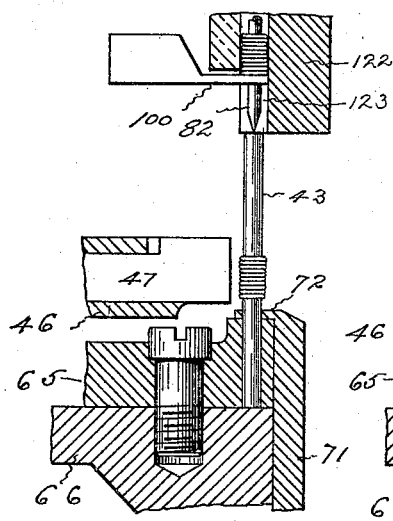
Figure 14:
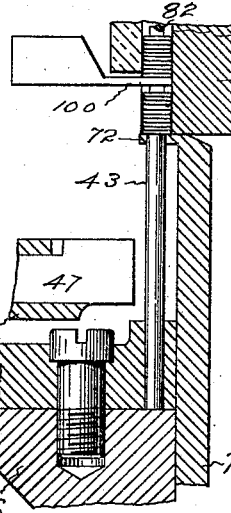
Figure 15:
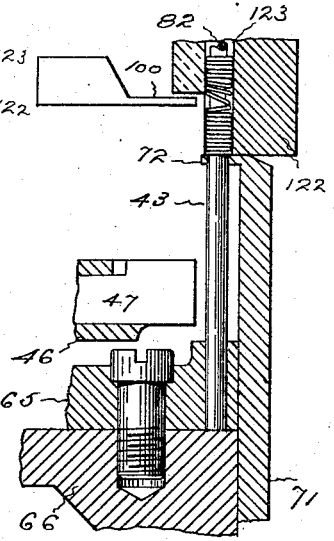
Figure 16:
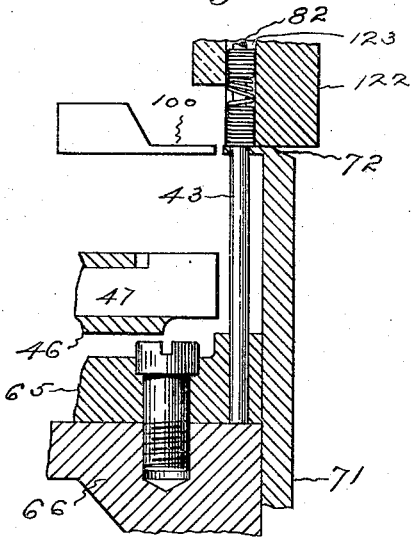

The mandrel pin 43 is fastened to a block 65 that is secured to a slide 66 which is movably located below the bender slide 46. (Figs. 4, 34). The pin slide 66 is normally held back by a spring 67 that thrusts between the rear end of the slide and a stud 68 that is fastened to the bender slide 46. Attached to the bed back of this slide 66 is a bracket 69 that has a screw 70 which butts against the rear end of the slide. The spring 67 normally holds the slide 66 back so that the mandrel pin 63 stands just in front of the bender. The screw 70, however, is so adjusted that it prevents the pin from being retracted so far as to obstruct the feed of the wires. When the bender slide 46 is moved forward the spring 67 holds the slide 66 back until after the bender has bent the wires around the pin, then the parts move forward together as the wires are being fluxed. (Fig. 34). Held by and vertically movable in the front end of the slide 66 is the ejector 71, the upper end 72 of which extends rearwardly and embraces the pin. Below the ejector and supported in a guide-way on the bed so that it is movable vertically is a slide 73. On the front of this slide and projecting beneath the lower end of the ejector is a block 74. Springs 75 connect this slide and the ejector. These springs normally hold the ejector down, but they are sufficiently flexible to allow the ejector to move forward with the pin slide by which it is carried when the ends of the bent wires are taken into contact with the flux wheel. (Figs. 4, 5, 37). The ejector slide is lifted by one end of the bell crank lever 76. The other end of this lever carries a roll 77 which is held in contact with a cam 78 on the shaft 79 by means of the spring 80. (Figs. 5, 6). The shaft 79 extends from front to rear and at its back end has a bevel gear 81 that meshes with a bevel gear 28. (Fig. 6). By means of this mechanism, when the feeding, bending, and forming mechanisms are being operated, at the proper time determined by the cam 78, the ejector is lifted so as to raise the links from the position in which they are formed (Fig. 13), onto the lower end of a magazine rod 82. (Fig. 14).

The fluxing wheel 49 is supported on a shaft 83 and its lower edge turns in a pan 84, which contains the fluxing compound. (Fig. 4). This pan is removably supported by the bed of the machine below the fluxing wheel. (Fig. 3). The fluxing wheel shaft 83 on its front end has a ratchet wheel 85, engaging with which is a pawl 86 that is mounted on a plate 87 which is loosely supported on a sleeve that surrounds the shaft 83. (Fig. 4). A link 88 connects the pawl plate 87 with one end of a bell crank lever 89. The other end of this lever has a roll 90 which is held in contact with the periphery of the cam 91 on the shaft 79. (Fig. 3). By means of this mechanism the fluxing wheel is given a slow intermittent rotatory movement. In order to regulate the amount of fluxing material on the edge of the wheel so that just the right amount will be applied to the ends of the wires, a gage wheel 92 is provided. This gage wheel is mounted on a shaft 93 which has a worm wheel 94 that meshes with a worm 95 on a shaft 96. (Fig. 5). The front end of the shaft 96 has a gear 97 that meshes with a gear 98 which is driven by a pinion 99 on the front end of the shaft 79. (Fig. 3).

Figure 17:
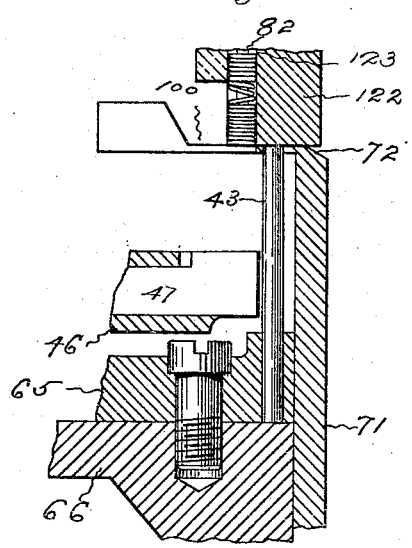

After the links have been formed, the ejector rises and carries them up beneath the gate 100, (Fig. 14); the gate is then swung out, (Fig. 15) and down, (Fig. 16); and then in under the lifted links, the ejector and pin moving out of the way, (Fig. 17). After this the gate rises to its first position, carrying the links up on the magazine rod. (Fig. 13). This gate is mounted on the front end of a bar 101 which is pivoted to a link 102 that swings from an overhanging arm 103. (Figs. 4, 5). The bar is at its rear end guided by vertical pins 104 and a horizontal pin 105. (Figs. 2, 4). The overhanging arm to which the front end of the gate bar is swiveled, is fastened to the upper end of a spindle 106. This spindle is supported vertically by suitable bearings in the frame and is normally pulled down by a spring 107. The spindle, at the proper time is raised by one end of the angle lever 108 which on the other end has a roll 109 that is in contact with the periphery of the cam 110 on the shaft 79. (Fig. 5). Attached to the spindle 106 near its lower end is a rocker arm 111 which has a roll 112 in contact with the face of the cam 113. (Figs. 5, 6). The cam 110 through the lever 108 at the proper time raises the spindle, and the cam 113 through the arm 111 at the proper time oscillates the spindle. The raising and lowering and oscillating of the spindle gives the gate 100 at the end of the bar 101 the four-fold motion above described for getting beneath and lifting the links which are brought up by the ejector.

The magazines have a large number of link receiving rods 82, the rods for receiving open links or staples being oblong in cross-section (Fig. 7), and those for receiving closed links or rings being circular in cross-section. (Fig. 8). These rods are arranged vertically with their lower ends free. The upper ends of the rods for the staples are shown as secured to a bar 114, and the lower ends as retained in position by a grooved plate 115 that by arms 116 is fastened to the base 117 of the magazine support. Each end of the bar 114 is removably fastened by a clamp 118 to the upper end of a standard 119, which is also secured to the base of the magazine support. (Figs. 7, 7ᴬ, 24). The rods for receiving rings, at their upper ends are attached to a bar 120 which is supported by posts 121 that stand up from the upper edge of the plate 122. (Figs. 4, 8). The plate 122 has parallel vertical grooves 123 in which lie the rods 82. The plate 122 at each end has a tongue 124 which fits a vertical groove in the edge of the support 125. The support 125 is fastened to the top of the magazine supporting slide 126. (Figs. 4, 8, 8ᴬ). When the clamps 118 are loosened the staple magazine is free to be lifted out. The ring magazine is simply dropped into place so that it can be readily removed. Either one of these magazines can be used with this machine, depending upon whether open links or closed links are to be made.

In a machine already built, and which is illustrated by the accompanying drawings 10 fine wires are fed in at each movement of the feed mechanism. The ends of these 10 wires are simultaneously severed, and are all bent, fluxed, formed and carried up together onto a magazine rod. Each rod holds in this particular machine 350 links, that is, each rod is filled by 35 revolutions of the machine. After a rod is filled, the wire feeding, cutting, bending, fluxing, forming and ejecting mechanisms are stopped and simultaneously mechanism for feeding the magazine so as to move another rod over the mandrel pin is set into operation. After the magazine has been moved, the mechanism for accomplishing this rests and the other mechanisms resume their functions.

When the magazine is moved the rods that have been filled with links are carried with their lower ends over a rail 214 (Figs. 1, 2, 3, 4), which keeps the links from dropping off. The magazine slide 126, upon which the magazine supports are fastened, is dove-tailed and lies in a dove-tailed guideway in the top of the frame. (Figs. 1, 2, 4). Adjustably fastened to the top of the magazine slide is a feed plate 127 with ratchet teeth in its front edge, and above this is a locking plate 128 with rack teeth in its front edge. (Figs. 1, 2, 3, 4). Adapted to engage with the ratchet teeth of the feed plate are two pawls 129. These pawls are mounted on a slide bar 130 with the feed point of one set half a tooth in advance of the other. These are designed in this manner so that first one pawl feeds and then the other, this permitting the ratchet teeth to be made coarse and strong without giving the magazine too much movement. (Fig. 22). The slide bar 130 is connected by a link 131 with the upper end of a lever 132, the lower end of which is connected by a link 133 with a crank stud 146 that is adjustable on the end of the shaft 134. (Figs. 22, 23). When this crank is rotated the lever and links and pawls feed the magazine and move an empty rod into position to receive links. Adapted to engage with the teeth of the lock plate 128 are two bolts 135 one of which is set half a tooth in advance of the other so that first one engages a locking tooth and then the other. This permits the locking teeth to be made coarse and strong, as are the feed teeth. The lock bolts 135 are connected by pins 136 with a yoke plate 137 that is pivotally mounted on the end of an angle lever 138. The other end of this angle lever has a roll 139 that is held in contact with the cam 140 on the shaft 134, by a spring 141. (Fig. 22). The cam 140 through the lever 138 at the proper time withdraws the lock pins from the teeth of the lock plate and thus releases the magazine slide and allows it to be fed. After the magazine has been fed, one or the other of the locking bolts enters a tooth and holds it in position. The spring 141 not only tends to hold the lever 138 with the roll 139 against the cam 140 but causes one of the locking bolts to enter a notch in the locking plate, the yoke plate swinging according to conditions. In order to release the magazine feed by hand when desired, a cam 142 is pivoted on the end of the lever 138. This cam engages the edge of the frame and it is provided with a handle 143 which can be swung out so that the cam will force the end of the lever 138 forward and withdraw both of the locking bolts from the teeth of the lock plate. The cam 142 is connected by a link 147 with one end of a lever 144, the other end of which is connected with a sliding bar 145 that carries pins 148 adjacent to the feed pawls. When the locking bolts are thrown out by the movement of the cam handle, these connections move the pins 148 against the pawl arms so that the driving points of the pawls are held out of engagement with the teeth on the front edge of the feed plate. (Fig. 22). When the feed pawls and the locking bolts are thus disengaged, the magazine slide and the magazine which it carries are free to be slipped sidewise out of the machine.

The shaft 134 which carries the cam that actuates the magazine lock and the crank which actuates the magazine feed, extends rearwardly and is supported by suitable bearings on the top of the frame. Fastened to the rear end of this shaft is a disk 149 (Fig. 1). This disk has one ratchet notch engaging which, so as to hold the magazine mechanisms, is a pawl 150 that is on the end of a stationary arbor 151 which has an arm 152 that is drawn down by a spring 153. The disk carries an arbor 154. This arbor back of the disk has a latch 155, and in front of the disk has an arm 156. A spring 157 pulls this arm and latch toward the axis of the disk. (Fig. 18).

Extending in line with the shaft 134 but disconnected therefrom is a shaft 158. (Fig. 1). On the end of this shaft 158 adjacent to the disk 149 that is fastened to the shaft 134 is a single toothed driving wheel 159. At the proper time the latch 155 carried by the disk 149 is released and is drawn into position to be engaged by the tooth of the driving wheel 159 so that the disk 149 and shaft 134 which operates the magazine feed and lock will be actuated by the wheel 159 and shaft 158. (Figs. 18, 19). The shaft 158 on the rear end has a gear 160. (Fig. 1). This gear meshes with a pinion 161 that is designed to be connected with a shaft 162 by means of a clutch 163. (Figs. 2, 6). The shaft 162 on its inner end has a bevel gear 164 that meshes with a bevel gear 165 on the shaft 32. (Fig. 6). The shaft 32, as previously described, is geared to and driven from the driving shaft 36 when the clutch on that shaft is engaged. The clutch 163 is adapted to be moved for clutching and releasing the pinion 161 by the fork 166, which has its lower end connected with a rod 167 that extends through the base to the front of the machine and is adapted to be moved in one direction by a spring 213 and in the other direction by a hand lever 168. (Fig. 6). By pulling this lever the magazine feeding and locking mechanisms are connected with the driving mechanism. The spring causes the disconnection of these mechanisms.

On the shaft 158 in front of the gear 160 is a pinion 169 that meshes with a gear 170 fastened to a pinion 171 that meshes with a gear 172. (Figs. 1, 2). The gear 172 is fastened to a shaft 173 on the rear end of which is a cam 174 and on the front end of which is a cam 175. (Fig. 1). Held by a spring 176 in engagement with the periphery of the cam 175 is a roller 177 on a rocker arm 178. This rocker arm is fixed to one end of an arbor 179. On the other end of this arbor is a latch operating lever 180. (Figs. 1, 18). The free end of the lever 180 has a lug 181 that projects toward the front, and the free end of the latch 155 has a lug 182 that projects toward the back. (Figs. 18, 19, 20, 21). With the lever 180 in its normal position on the low part of the cam 175, the lug 181 on the lever engages the lug 182 on the latch and holds the latter back so that the driving wheel 159 rotates without turning the disk 149. When the high part of the cam 175 oscillates the lever 180, the lug 181 on the lever is lifted above the lug 182 on the latch so as to release the latter and allow it to be drawn by the spring 157 into the path of the tooth of the wheel 159. When the parts are engaged in this manner the disk 149 is driven by the driving wheel 159 for actuating the magazine mechanism. The spring 176 immediately returns the lever 180 so that as the disk 149 makes one revolution and the latch comes around its lug 182 engages the lug 181 on the lever and the hook is drawn out from its engagement with the tooth of the driving wheel 159. This disconnects the parts so that the disk 149 stops.

It is stopped in the correct position by the pawl 150 which engages the periphery of the disk, and it is also stopped by the engagement of the end of the latch with the latch stopping block 183. (Figs. 18, 19).

The pinions and gears 169, 170, 171, and 172, which drive the cam shaft 173, in the machine illustrated, are timed eight to one so that once in every eight revolutions of the shaft 158 the latch is released and that shaft is connected with the shaft 134 so as to give it one revolution and effect one feed of the magazine. And as the pinion 161 and gear 160 are in the ratio of five to one, the shaft 134 is rotated once in every forty revolutions of the shaft 32, which drives the feeding, cutting, bending, fluxing, forming and ejecting mechanisms, but as these mechanisms are, by mechanism about to be described, stopped for five revolutions of the shaft 32 while the magazine is being fed, the magazine is fed once after every thirty-five operations of the other mechanisms.

Engaging with the cam 174 that is on the rear end of the shaft 173 is a roll 204 on the end of a rocker arm 184. (Figs. 1, 2). This rocker arm is fastened to the rear end of an arbor 185 which on its front end has a rocker arm 186 that extends down into the bed. The lower end of this arm 186 is connected with a sliding bar 187, (Figs. 6, 12), and the lower end of the arm 186 and the bar 187 are drawn in one direction by a spring 188. (Fig. 12). Secured to this bar is a double cone 189 which is free to slide on a rod 190. Secured to this rod is a fork 191, which is arranged to throw the clutch 31. (Fig. 6). Between one end of the cone and a collar 192 fixed to the rod is a spring 193, and between the other end of the cone and a collar 194 fixed to the rod is a spring 195. (Fig. 12). Pivoted to the frame near one end of the double cone is a lever 196 having a screw 197 that is adapted to engage one end of the double cone and a tooth 198 that is adapted to engage the collar 192. A spring 199 tends to draw up the lever 196. Pivoted to the frame near the other end of the double cone is a lever 200 which has a screw 201 adapted to engage the end of the cone and a tooth 202 adapted to engage the collar 194. (Fig. 12). This lever is held up by a spring 203. As the arm 186 is moved in one direction by means of the cam 174, the double cone is moved so as to compress the spring 195 until the cone engages the screw 201 and moves the lever 200 and disengages the tooth 202 from the collar 194, then the rod 190 is thrown suddenly and gives the clutch a quick movement. (Fig. 12). When the clutch is thrown in this direction, the clutch lug 30 is withdrawn from engagement with the clutch lug 29 and this, as previously described, disconnects the shaft 32 from the shaft 27 which drives the wire feeding, cutting, bending, fluxing, forming and ejecting mechanisms. (Fig. 6). When permitted by the cam 174, the arm 186 is drawn by the spring 188 in the opposite direction, and the bar 187 moves the cone 189 so as to compress the spring 193 until the screw 197 is engaged by the cone and the tooth 198 is disengaged from the collar 192 and allows the rod 190 to be thrown in the opposite direction. (Fig. 12). As the rod is thrown in this direction, the clutch is moved so that the clutch lug 30 engages the clutch lug 29 and connects the shaft 32 with the shaft 27 and sets in operation the link making mechanisms. The cams are so timed and the clutches thrown so that the shaft 32 is disengaged from the shaft 27 when the magazine feed mechanisms are to be actuated, and the shaft 32 is connected with the shaft 27 when the magazine feeding mechanisms are stationary and it is time to feed, cut, bend, flux, form and eject the wires. When the shaft 32 is connected with the shaft 27 by the clutch for this purpose, the cam 175 and the lever 180 are holding the latch so that the shaft 158 and the shaft 134 are disconnected and the magazine is stationary. (Fig. 18).

After the last magazine rod has been filled with links the machine is stopped. To accomplish this automatically a block 205 is adjustably clamped to one end of the magazine slide 126 (Fig. 1), so that during the feed of the magazine after the last rod has been filled the block 205 will engage and depress the rod 206 which is normally held raised by a spring 207. (Figs. 25, 26). The lower end of the rod 206 is connected to one end of a lever 208. The other end of the lever has a shoulder 209 that is adapted to engage a lug 210 that projects from a sleeve 211, which is fast to the rod 167. (Figs. 25, 26). The rod 167, as previously described, extends to the rear of the machine and carries the spring 213 and fork 166 which throw the clutch 163. A lever 212 is also engaged with the rod 206. When the magazine reaches the predetermined limit of its feed and the block 205 automatically depresses the rod 206, or when that rod is depressed by means of the hand lever 212, the catch lever 208 is oscillated and releases the rod 167 which is then moved by the spring 213 so as to withdraw the clutch 163 and disconnect the shaft 162 from its driving pinion 161. (Fig. 6A). This causes the stopping of the whole machine, for at the time the magazine is being fed, the link making mechanisms are disconnected and stationary.

The invention claimed is:

1. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

2. In a machine for making wire links, the combination of mechanism for feeding wire, mechanism for bending the fed wire, mechanism for fluxing the ends of the bent wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

3. In a machine for making wire links, the combination of mechanism for feeding wire, mechanism for cutting the fed wire, mechanism for fluxing the ends of the cut wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

4. In a machine for making wire links, the combination of mechanism for feeding wire, mechanism for cutting the fed wire, mechanism for bending the cut wire, mechanism for forming the wire into links, mechanism for ejecting the links, a magazine for receiving the links, mechanism for moving the magazine, mechanism for locking the magazine, and mechanism for stopping the machine actuated by the last movement of the magazine.

5. In a machine for making wire links, the combination of mechanism for feeding wire, mechanism for cutting the fed wire, mechanism for bending the cut wire, mechanism for fluxing the ends of the bent wire, mechanism for ejecting the bent wire, a magazine for receiving the bent wire, mechanism for moving the magazine, mechanism for locking the magazine, and mechanism for stopping the machine actuated by the last movement of the magazine.

6. In a machine for making wire links, the combination of mechanism for feeding wire, mechanism for cutting the fed wire, mechanism for bending the cut wire, mechanism for fluxing the ends of the bent wire, mechanism for forming the fluxed wire into links, a magazine for receiving the links, mechanism for moving the magazine, mechanism for locking the magazine, and mechanism for stopping the machine actuated by the last movement of the magazine.

7. In a machine for making wire links, the combination of mechanism for feeding wire, mechanism for cutting the fed wire, mechanism for bending the cut wire, mechanism for engaging and applying flux to the ends of the bent wire, mechanism for forming the fluxed wire into links, and mechanism for ejecting the links.

8. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, a magazine for receiving the links, and mechanism for moving the magazine.

9. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, a magazine for receiving the links, mechanism for moving the magazine, and mechanism for stopping the machine actuated by the last movement of the magazine.

10. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, a magazine for receiving the links, mechanism for moving the magazine, and mechanism for locking the magazine.

11. In a machine for making wire links, the combination of mechanism for cutting the wire, mechanism for bending the cut wire, mechanism for fluxing the ends of the bent wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

12. In a machine for making wire links, the combination of mechanism for bending wire, mechanism for fluxing the ends of the bent wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

13. In a machine for making wire links, the combination of mechanism for cutting the wire, mechanism for fluxing the ends of the cut wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

14. In a machine for making wire links, the combination of mechanism for cutting wire, mechanism for bending the cut wire, mechanism for forming the bent wire into links, mechanism for ejecting the links, a magazine for receiving the links, mechanism for moving the magazine, mechanism for locking the magazine, and mechanism for stopping the machine actuated by the last movement of the magazine.

15. In a machine for making wire links, the combination of mechanism for cutting wire, mechanism for bending the cut wire into links, mechanism for fluxing the ends of the bent wire, mechanism for ejecting the links, a magazine for receiving the links, mechanism for moving the magazine, mechanism for locking the magazine, and mechanism for stopping the machine actuated by the last movement of the magazine.

16. In a machine for making wire links, the combination of mechanism for cutting wire, mechanism for bending the cut wire, mechanism for fluxing the ends of the bent wire, mechanism for forming the fluxed wire into links, a magazine for receiving links, mechanism for moving the magazine, mechanism for locking the magazine, and mechanism for stopping the machine actuated by the last movement of the magazine.

17. In a machine for making wire links, the combination of mechanism for cutting wire, mechanism for bending the cut wire, mechanism for engaging and applying flux to the ends of the bent wire, mechanism for forming the fluxed wire into links, and mechanism for ejecting the links.

18. In a machine for making wire links, the combination of mechanism for cutting wire, mechanism for bending the cut wire, mechanism for fluxing the ends of the bent wire, mechanism for forming the fluxed wire into links, mechanism for ejecting the links, and a magazine for receiving the links.

19. In a machine for making wire links, the combination of mechanism for cutting wire, mechanism for bending the cut wire, mechanism for fluxing the ends of the bent wire, mechanism for forming the fluxed wire into links, mechanism for ejecting the links, a magazine for receiving the links, mechanism for moving the magazine, and mechanism for stopping the machine actuated by the last movement of the magazine.

20. In a machine for making wire links, the combination of mechanism for cutting wire, mechanism for bending the cut wire, mechanism for fluxing the ends of the bent wire, mechanism for forming the fluxed wire into links, mechanism for ejecting the links, a magazine for receiving the links, mechanism for moving the magazine, and mechanism for locking the magazine.

21. In a machine for making wire links, the combination of mechanism for cutting wire, mechanism for bending the cut wire, mechanism for fluxing the ends of the bent wire, mechanism for forming the fluxed wire into links, mechanism for ejecting the links, a magazine for receiving the links, and mechanism for moving the magazine.

22. In a machine for making wire links, the combination of mechanism for feeding wire, mechanism for bending the fed wire, mechanism for fluxing the ends of the bent wire, mechanism for forming the fluxed wire into links, mechanism for ejecting the links, a magazine for receiving the links, and mechanism for moving the magazine.

23. In a machine for making wire links, the combination of mechanism for feeding wire, mechanism for cutting the fed wire, mechanism for fluxing the ends of the cut wire, mechanism for forming the fluxed wire into links, mechanism for ejecting the links, a magazine for receiving the links, and mechanism for moving the magazine.

24. In a machine for making wire links, the combination of mechanism for feeding wire, mechanism for cutting the fed wire, mechanism for bending the cut wire, mechanism for forming the bent wire into links, mechanism for ejecting the links, a magazine for receiving the links, and mechanism for moving the magazine.

25. In a machine for making wire links, the combination of mechanism for feeding wire, mechanism for cutting the fed wire, mechanism for bending the cut wire into links, mechanism for fluxing the ends of the bent wire, mechanism for ejecting the links, a magazine for receiving the links, and mechanism for moving the magazine.

26. In a machine for making wire links, the combination of mechanism for feeding wire, mechanism for cutting the fed wire, mechanism for bending the cut wire, mechanism for fluxing the ends of the bent wire, mechanism for forming the fluxed wire into links, a magazine for receiving the links, and mechanism for moving the magazine.

27. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, and a magazine for receiving the links.

28. In a machine for making wire links, the combination of mechanism for feeding wire, mechanism for cutting the fed wire, mechanism for bending the cut wire, mechanism for fluxing the ends of the bent wire, mechanism for forming the fluxed wire into links, mechanism for ejecting the links, a magazine for receiving the links, and mechanism for stopping the machine when the magazine is full.

29. In a machine for making wire links, the combination of mechanism for feeding wire, mechanism for bending the fed wire, mechanism for fluxing the ends of the bent wire, mechanism for forming the fluxed wire into links, mechanism for ejecting the links, and a magazine for receiving the links.

30. In a machine for making wire links, the combination of mechanism for feeding wire, mechanism for cutting the fed wire, mechanism for fluxing the ends of the cut wire, mechanism for forming the fluxed wire into links, mechanism for ejecting the links, and a magazine for receiving the links.

31. In a machine for making wire links, the combination of mechanism for feeding wire, mechanism for cutting the fed wire, mechanism for bending the cut wire, mechanism for forming the bent wire into links, mechanism for ejecting the links, and a magazine for receiving the links.

32. In a machine for making wire links, the combination of mechanism for feeding wire, mechanism for cutting the fed wire, mechanism for bending the cut wire into links, mechanism for fluxing the ends of the bent wire, mechanism for ejecting the links, and a magazine for receiving the links.

33. In a machine for making wire links, the combination of mechanism for feeding wire, mechanism for cutting the fed wire, mechanism for bending the cut wire, mechanism for fluxing the ends of the bent wire, mechanism for forming the fluxed wire into links, and a magazine for receiving the links.

34. In a machine for making wire links, the combination of mechanism for feeding wire, mechanism for bending the fed wire, mechanism for engaging and applying flux to the ends of the bent wire, mechanism for forming the fluxed wire into links, and mechanism for ejecting the links.

35. In a machine for making wire links, the combination of mechanism for feeding wire, mechanism for cutting the fed wire, mechanism for engaging and applying flux to the ends of the cut wire, mechanism for forming the fluxed wire into links, and mechanism for ejecting the links.

36. In a machine for making wire links, the combination of mechanism for feeding wire, mechanism for cutting the fed wire, mechanism for bending the cut wire, mechanism for forming the bent wire into links, a magazine, and mechanism for ejecting the links into the magazine.

37. In a machine for making wire links, the combination of mechanism for feeding wire, mechanism for cutting the fed wire, mechanism for bending the cut wire, mechanism for engaging and applying flux to the ends of the bent wire, and mechanism for forming the fluxed wire into links.

38. In a machine for making wire links, the combination of mechanism for bending wire, mechanism for fluxing the ends of the bent wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

39. In a machine for making wire links, the combination of mechanism for bending wire, mechanism for forming the bent wire into links, mechanism for ejecting the links, a magazine for receiving the links, mechanism for moving the magazine, mechanism for locking the magazine, and mechanism for stopping the machine actuated by the last movement of the magazine.

40. In a machine for making wire links, the combination of mechanism for bending the wire into links, mechanism for fluxing the ends of the bent wire, mechanism for ejecting the links, a magazine for receiving the links, mechanism for moving the magazine, mechanism for locking the magazine, and mechanism for stopping the machine actuated by the last movement of the magazine.

41. In a machine for making wire links, the combination of mechanism for bending the wire, mechanism for fluxing the ends of the bent wire, mechanism for forming the fluxed wire into links, a magazine for receiving the links, mechanism for moving the magazine, mechanism for locking the magazine, and mechanism for stopping the machine actuated by the last movement of the magazine.

42. In a machine for making wire links, the combination of mechanism for bending the wire, mechanism for engaging and applying flux to the ends of the bent wire, mechanism for forming the fluxed wire into links, and mechanism for ejecting the links.

43. In a machine for making wire links, the combination of mechanism for bending the wire, mechanism for fluxing the ends of the bent wire, mechanism for forming the fluxed wire into links, mechanism for ejecting the links, and a magazine for receiving the links.

44. In a machine for making wire links, the combination of mechanism for bending wire, mechanism for fluxing the ends of the bent wire, mechanism for forming the fluxed wire into links, mechanism for ejecting the links, a magazine for receiving the links, and mechanism for moving the magazine.

45. In a machine for making wire links, the combination of mechanism for bending the wire, mechanism for fluxing the ends of the bent wire, mechanism for forming the fluxed wire into links, mechanism for ejecting the links, a magazine for receiving the links, mechanism for moving the magazine, and mechanism for locking the magazine.

46. In a machine for making wire links, the combination of mechanism for feeding wire, mechanism for cutting the fed wire, mechanism for bending the cut wire, mechanism for forming the cut wire into links, mechanism for ejecting the links, a magazine for receiving the links, mechanism for moving the magazine, and mechanism for locking the magazine.

47. In a machine for making wire links, the combination of mechanism for feeding wire, mechanism for cutting the fed wire, mechanism for bending the cut wire, mechanism for forming the cut wire into links, mechanism for ejecting the links, and a magazine for receiving the links.

48. In a machine for making wire links, the combination of mechanism for fluxing the ends of the wire, mechanism for forming the fluxed wire into links, mechanism for ejecting the links, a magazine for receiving the links, mechanism for moving the magazine, mechanism for locking the magazine, and mechanism for stopping the machine actuated by the last movement of the magazine.

49. In a machine for making wire links, the combination of mechanism for fluxing the ends of the wire, mechanism for forming the fluxed wire into links, a magazine for receiving the links, mechanism for moving the magazine, mechanism for locking the magazine, and mechanism for stopping the machine actuated by the last movement of the magazine.

50. In a machine for making wire links, the combination of mechanism for forming the wire into links, a magazine for receiving the links, mechanism for moving the magazine, mechanism for locking the magazine, and mechanism for stopping the machine actuated by the last movement of the magazine.

51. In a machine for making wire links, the combination of a magazine for receiving the links, mechanism for moving the magazine, mechanism for locking the magazine, and mechanism for stopping the machine actuated by the last movement of the magazine.

52. In a machine for making wire links, the combination of mechanism for feeding wire, mechanism for cutting the fed wire, mechanism for bending the cut wire into links, and a magazine for receiving the links.

53. In a machine for making wire links, the combination of mechanism for feeding wire, mechanism for cutting the fed wire, mechanism for bending the cut wire into links, mechanism for fluxing the ends of the bent wire, and a magazine for receiving the links.

54. In a machine for making wire links, the combination of mechanism for feeding wire, mechanism for cutting the fed wire, a mandrel, a bender for bending the wire around the mandrel, a fluxing wheel, and mechanism for carrying the ends of the wires bent around the mandrel into engagement with the fluxing wheel.

55. In a machine for making wire links, the combination of mechanism for feeding wire, mechanism for cutting the fed wire, a mandrel, mechanism for bending the wire about the mandrel, a fluxing wheel, a roll to gage the amount of fluxing material on the wheel, and means for carrying the ends of the wires about the mandrel into contact with the fluxing material on said wheel.

56. In a machine for making wire links, the combination of mechanism for feeding wire, mechanism for cutting the fed wire, a mandrel, means for bending the cut wire about the mandrel, a pair of formers, and means for causing the formers to bend the wires still further about the mandrel.

57. In a machine for making wire links, the combination of mechanism for feeding wire, mechanism for cutting the fed wire, a mandrel, mechanism for bending the cut wire about the mandrel, formers, mechanism for causing the formers to bend the wire still further about the mandrel, and an ejector for lifting the wires bent by the formers from the mandrel.

58. In a machine for making wire links, the combination of mechanism for feeding wire, mechanism for cutting the fed wire, a mandrel, mechanism for bending the cut wire about the mandrel, formers, mechanism for causing the formers to bend the wire still further about the mandrel, an ejector for lifting the links thus formed from the mandrel, a magazine having a plural number of rods for receiving the links raised by the ejector, and mechanism for intermittently moving the magazine and causing said rods to successively register with the mandrel.

59. In a machine for making wire links, the combination of mechanism for feeding wire, mechanism for cutting the fed wire, a mandrel, mechanism for bending the wire about the mandrel, formers for shaping the wire on the mandrel, an ejector for lifting the wires from the mandrel, a gate having vertical and horizontal movements for lifting the formed wires from the ejector, and a magazine rod for receiving the wires.

60. In a machine for making wire links, the combination of mechanism for feeding wire, mechanism for cutting the fed wire, mechanism for bending the cut wire, mechanism for forming the bent wire, an ejector for lifting the formed wires, a magazine for receiving the wires from the ejector, mechanism for moving the magazine, and mechanism for stopping the magazine moving mechanism when the feeding, cutting, bending, and forming mechanisms are operating, and for stopping said mechanism when the magazine moving mechanism is operating.

61. A wire bending machine having mechanism for feeding wire, mechanism for cutting the fed wire, mechanism for bending the cut wire into staples, mechanism for feeding the staples to a magazine, and a magazine for receiving the staples.

JOSEPH MERRITT.
W. A. SAWYER.

Witnesses:
NELLIE PHOENIX,
CHARLOTTE S. HULL.

Copies of this patent may be obtained for five cents each, by addressing the "Commissioner of Patents, Washington, D. C."